Figure 1:
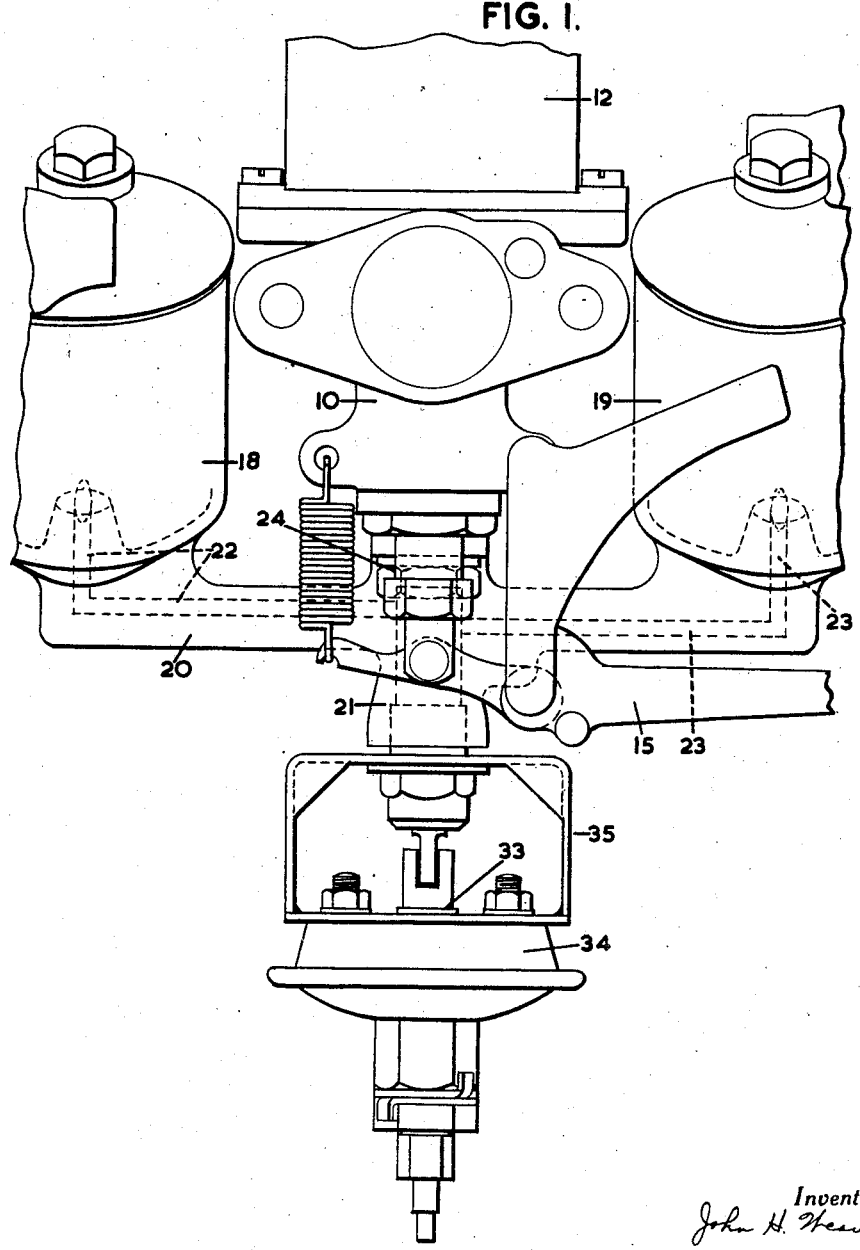

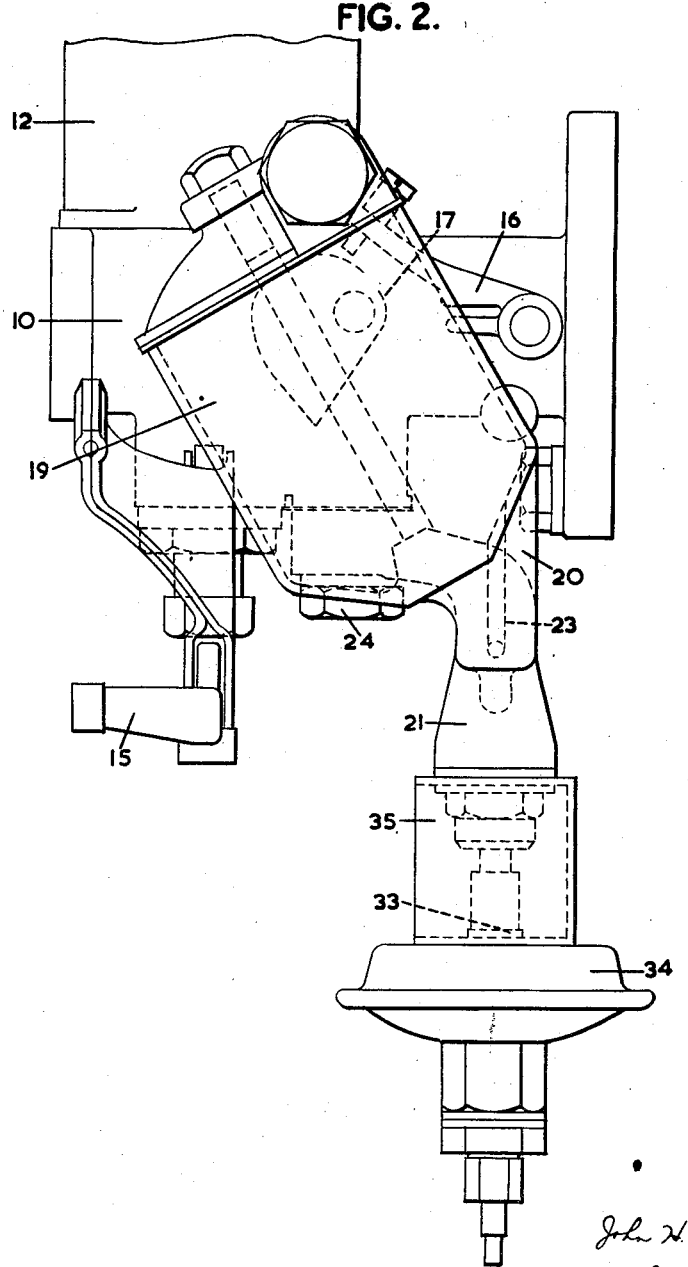

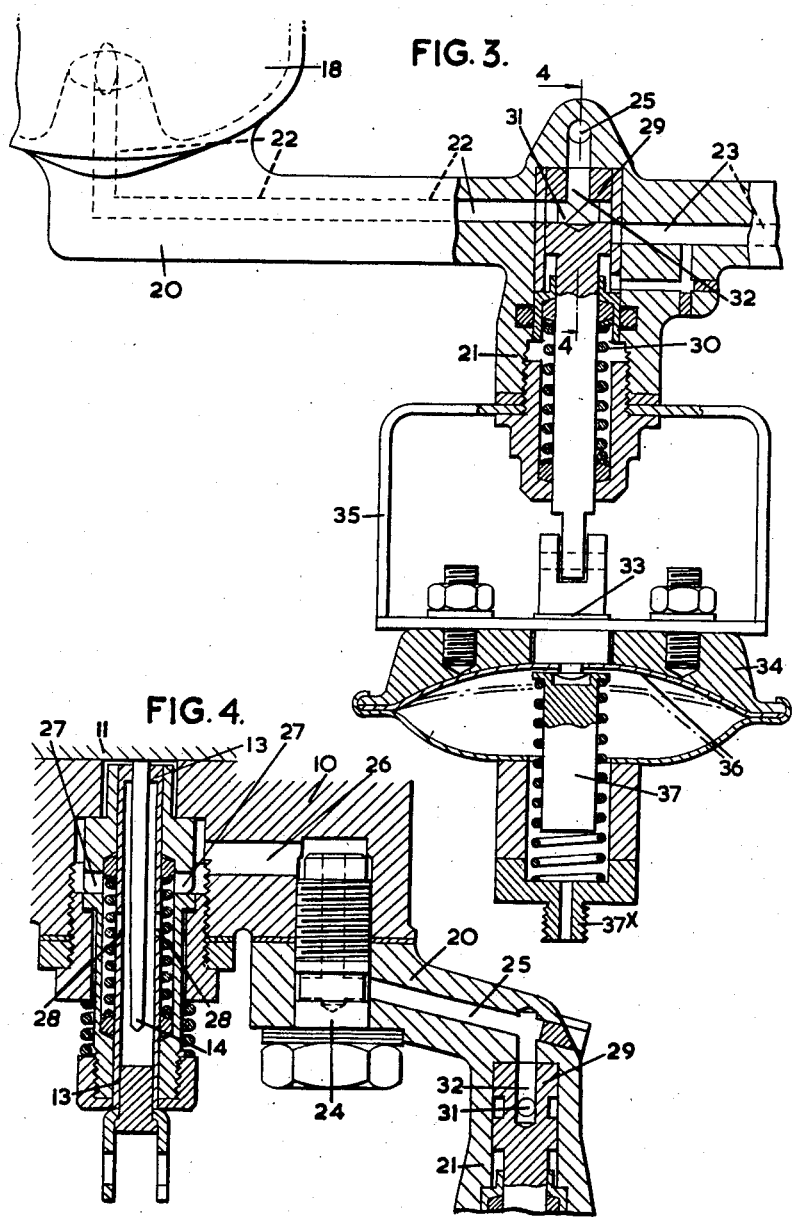

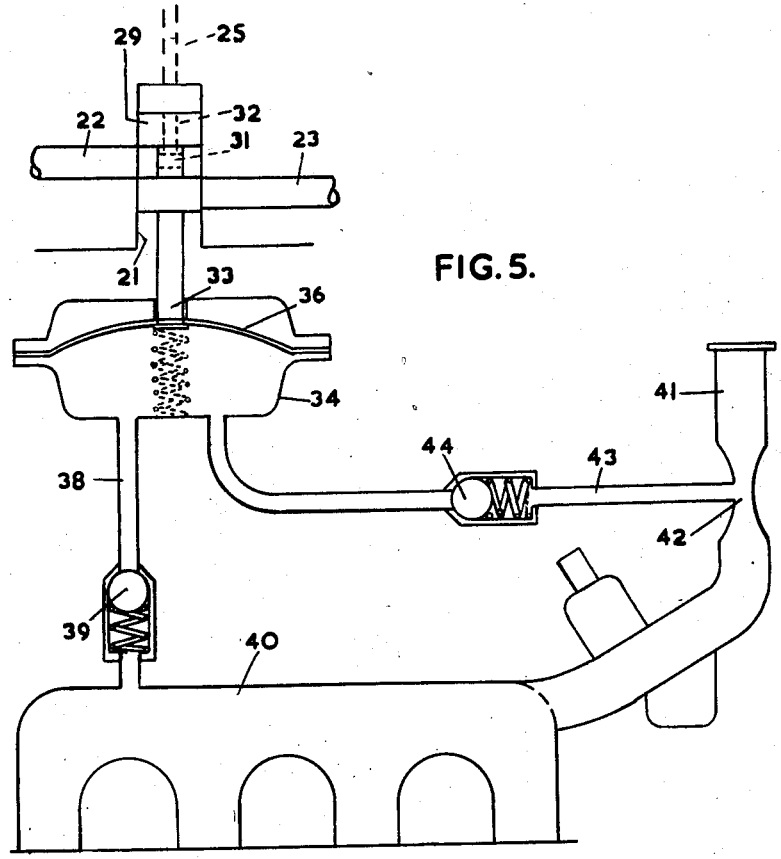

July 12, 1960  J. H. WEAVING  2,944,800
FUEL ECONOMISERS FOR PETROL ENGINES
OF THE RECIPROCATING PISTON TYPE
Filed Sept. 11, 1958  6 Sheets-Sheet 6

Inventor
John H. Weaving
By Scrivner and Parker
Attorneys

United States Patent Office 2,944,800
Patented July 12, 1960

2,944,800

FUEL ECONOMISERS FOR PETROL ENGINES OF THE RECIPROCATING PISTON TYPE

John H. Weaving, Copt Heath, Knowle, England, assignor to The Austin Motor Company Limited, Birmingham, England Filed Sept. 11, 1958, Ser. No. 760,349

6 Claims. (Cl. 261—18)

This invention relates to fuel economisers for petrol engines of the reciprocating piston type.

It is well known that to increase the compression ratio in an internal combustion engine of the type referred to not only increases the thermal efficiency, with consequential reduction in petrol consumption, but also increases the liability of the engine to detonate, that is to say, for the last part of each charge of petrol-air mixture in the combustion chamber to burn at an abnormally fast rate and thereby cause a characteristic noise known as knocking or pinking. In order to overcome or reduce this detonation, petrols having a high octane rating have been developed, but as detonation only occurs when the engine is running at comparatively low speeds under full throttle or full load conditions, the use of these more expensive high octane petrols at all times is not economic. Before the advent of high octane petrols it had become the occasional practice to injet into the petrol-air mixture, at a position between the carburetter and the engine, a special anti-knocking fluid such, for example, as a mixture of tetra-ethyl lead and methyl alcohol, but this has the disadvantages that it supplies additional fuel and that this special anti-knock liquid is not readily available.

The fuel economiser according to the present invention comprises two sources of petrol supply to the engine carburetter, one of high octane petrol and the other of an inferior regular or commercial grade, said supplies being under the control of a valve which is responsive to the suction prevailing in the engine induction manifold when this exceeds a predetermined and opposing spring load on said valve. The arrangement is such that when the engine is on full load or full throttle at low speed, and consequentially there is practically no suction in the induction manifold, the spring loading on the valve maintains it in a position in which the supply of inferior grade petrol is shut off and the supply of high octane petrol is open, whilst when the suction in the induction manifold increases to a value which will overcome the spring loading on the valve the latter moves to a position in which it closes the high octane petrol supply and opens up the supply of the inferior grade petrol to the carburetter.

The invention will now be more fully described with reference to and by the aid of the accompanying drawings, in which:

Figs. 1, 2, 3 and 4 are fragmentary views illustrating, in front elevation, side elevation, part sectional front elevation and sectional side elevation respectively, an application of the invention in which the valve which controls the petrol supplies to the engine carburetter is actuated by a diaphragm responsive to suction in the induction manifold, Fig. 4 being a section taken on the line 4, 4 of Fig. 3.

Figure 6:
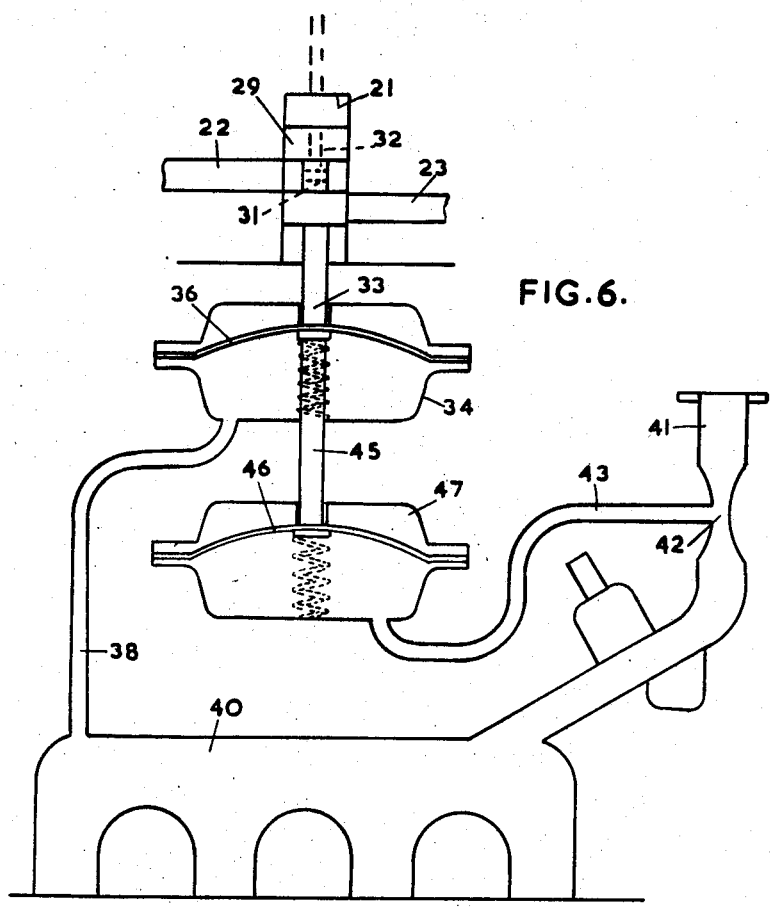
Figure 7:
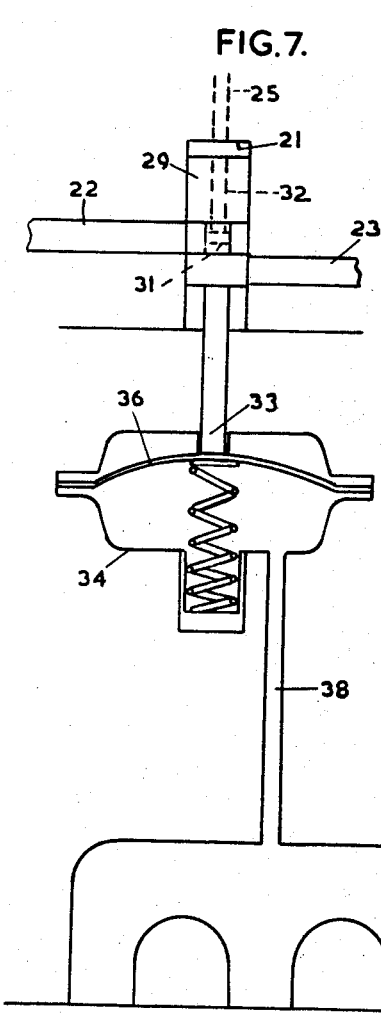
Figure 8:
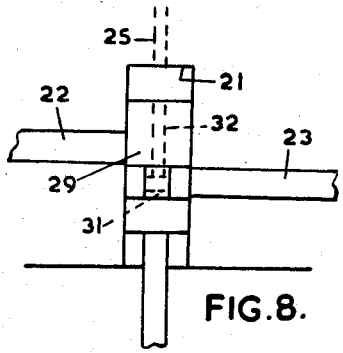
Figure 9:
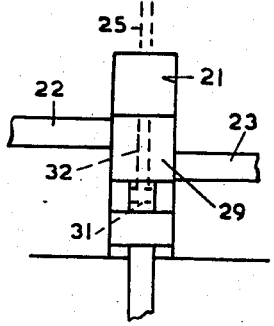

Figs. 5, 6 and 7 are diagrammatic views of modified applications, and Figs. 8 and 9 are detail views illustrating the operation of the valve shown in Fig. 7.

Referring particularly to the embodiment shown in Figs. 1, 2, 3 and 4, the carburetter 10 is of the well-known S.U. controllable jet type wherein a suction-operated piston 11, carried by a suction disc in a cylinder 12, varies the choke and, in addition, controls the delivery of petrol from a tubular jet 12 by means of a tapered needle 14 which depends from the piston 11 into the upper end of the jet tube 13, and in which, for choking when first starting up, the jet tube 13 is axially adjustable downwardly, against spring loading and in relation to the needle 14, by means of a lever 15, usually cable-operated by a knob on the facia or instrument panel in the vehicle, and a throttle valve is operated by a lever 16 to control the admission of petrol and air mixture to the engine induction manifold. The idling setting of the throttle valve can be adjusted by means of a stop cam 17 for the lever 16 on the carburetter body, which cam 17 can be angularly adjusted and fixed in any desired position.

There are two petrol supplies to the carburetter through separate float chambers 18, 19 at opposite ends of a casting 20 which is secured to the underside of the carburetter body casting and is formed at the centre with a valve chamber 21 and with ducts 22, 23 connecting the float chambers 18, 19 respectively to said valve chamber 21. The casting 20 is secured in position by a ported coupling bolt 24 which places a duct 25 from the top of the valve chamber 21 in communication with a duct 26 leading to the carburetter jet via ports 27 and holes 28 in the jet tube 13.

The supply from the float chamber 18 via the duct 22 is of high octane petrol and this duct 22 enters the valve chamber 21 at a somewhat higher level than the duct 23 which delivers petrol of an inferior regular or commercial grade from the float chamber 19, and the exit ends of these two ducts 22, 23 are controlled by a valve 29 which is of the dumbbell or double-landed slider type and is loaded by a spring 30 toward the position (shown in Figs. 3 and 4) and in which it places the duct 22 in communication with the duct 25, through ports 31, 32 and the lower land closes the exit end of the duct 23.

The stem of the valve 29 has a direct mechanical connection with a plunger 33 which is freely slidable through a bore through the top of a diaphragm chamber 34 carried by a bracket 35 clamped to the valve chamber 21, and this plunger 33 is connected to a flexible diaphragm 36 which is loaded upwardly by a spring-supported plunger 37. This diaphragm 36 divides the chamber 34 into two compartments, the upper one of which is subjected to atmospheric pressure, via the bore through which the plunger 33 is freely slidable, whilst the lower of these compartments is adapted to be connected, by a pipe (not shown), to the engine induction manifold, a tubular and externally screw-threaded spigot 37× being provided on the underside of the diaphragm chamber 34 for making the pipe connection therewith.

When the engine is on full load or full throttle at low speed, and consequentially there is practically no suction in the induction manifold, the spring loading on the valve 29 maintains it in the position (shown in Figs. 3 and 4) in which the supply of inferior grade petrol is shut off and that of the high octane petrol is open, whilst, when the suction in the induction manifold increases to a value which will overcome the spring loading on the valve 29, the diaphragm 36, under the pressure differential then prevailing in the chamber 34, draws the valve 29 downwardly until it shuts off the high octane petrol supply from the duct 22 and opens up the supply of inferior grade petrol from the duct 23. In the latter connection, the relative disposition of the exits from the ducts 22, 23 and the spacing of the lands on the upper end portion or head of the valve 29 are such that the changeover is progressive, one supply being reduced as the other is correspondingly increased, and that at no time will the quantity of fuel supplied to the carburetter be less than that necessary to keep the engine running in a normal manner.

The arrangement above described with reference to Figs. 1, 2, 3 and 4 would cater for most working conditions of an automobile engine except that of full throttle running at high engine speeds, under which exceptional condition the diaphragm-operated control valve would be so positioned as to deliver high octane petrol to the carburetter and cut off the supply of inferior grade petrol. For this particular condition the use of high octane petrol is not necessary and is uneconomic, and it is therefore desirable to modify the operation of said valve so that, when this condition obtains, the high octane petrol supply will be cut off and the inferior grade petrol will be supplied to the engine. Figs. 5 and 6, in which like reference numerals to those in Figs. 1, 2, 3 and 4 are employed to indicate like or analogous parts, show alternative means for effecting this modification in the operation of the supply control valve.

In the Fig. 5 arrangement, the suction side of the diaphragm chamber 34 is connected through a pipe line 38 including a spring-loaded ball valve 39 with the induction manifold 40 of the engine, the loading of this valve 39 being such that the latter will open when the suction increases to a value which will overcome the spring loading on the supply control valve 29, thereby subjecting the diaphragm 36 to this increased suction and causing it to operate said valve 29 so as to change-over the supply to the inferior grade petrol. In order to cater for full throttle running at high engine speeds, an induction pipe 41 leading into the manifold 40 is formed with a venturi 42 the throat of which is connected by a pipe line 43 including an auxiliary spring-loaded ball valve 44 to the suction side of the diaphragm chamber 34, the form of the venturi 42 and the loading of the auxiliary ball valve 44 being such that, under this condition, there is artificially created in the venturi 42 a high velocity flow of air or mixture such as will open the auxiliary ball valve 44 and create sufficient suction in the chamber 34 as will operate the diaphragm 36 to move the control valve 29 to the extreme position in which it cuts off the high octane supply and opens the supply of inferior grade petrol to the carburetter.

In the alternative modification shown in Fig. 6, the venturi 42 in the induction pipe 41 is retained but the ball valves 39, 44 are dispensed with. The pipe line 38 connects the suction side of the diaphragm chamber 34 directly to the engine induction manifold 40 and the diaphragm 36 has a depending stem 45 connecting it in series or tandem with a spring-supported auxiliary diaphragm 46 in a secondary diaphragm chamber 47 the suction side of which is connected by the pipe line 43 directly to the throat of the venturi 42. Under full throttle running at high engine speeds, the artificially created high flow through the venturi 42 is sufficient to cause the auxiliary diaphragm to operate and, through the stem 46 and main diaphragm 36, to move the valve 29 to the extreme position in which the high octane petrol supply is shut off and the inferior grade petrol is delivered to the carburetter.

With either of these modifications or alternative arrangements, care would require to be taken to ensure that the passages controlled by the supply valve 29 and the volume of the valve chamber 21 are no larger than is necessary for delivery or supply purposes so that change over from one fuel to the other may be accomplished as quickly as possible and thereby avoid transient detonation at the change over.

Under over-run conditions, when the inertia of the automobile is sufficient to keep it in motion, there is no need to supply fuel to the engine. In this condition the suction in the engine induction manifold is even greater than under part load conditions, and this very high suction may be used to advantage to effect complete cut-off of both petrol supplies to the carburetter, providing that the valve which controls them is designed for that purpose. Such an arrangement for effecting a further small fuel economy when over-run conditions obtain is illustrated in Figs. 7, 8 and 9 in which Fig. 7 shows the supply control valve 29 in the uppermost position in which the high octane petrol supply to the carburetter is open and the inferior grade petrol supply is cut-off, Fig. 8 shows the said valve 29 cutting off the high octane petrol supply and admitting inferior grade petrol to the carburetter, and Fig. 9 shows the valve 29 in a third position in which it cuts off both petrol supplies under the action of the high suction which prevails in the induction manifold 40 under over-run conditions. In this arrangement the upper land of the valve 29 is of such axial length as to enable it, when in the lowermost position (Fig. 9), to close the exits from both supply ducts 22, 23, and the chamber 21 is increased in length to accommodate the longer head of the valve 29 and the greater axial displacement.

Thus it will be seen that the invention provides a fuel economiser whereby high octane petrol will be supplied to the carburetter jet only at such times and under such running conditions when the use of said petrol is advantageous, and whereby change over to a supply of inferior grade petrol will automatically take place when said conditions no longer prevail.

Having fully described my invention, what I claim and desire to secure by Letters Patent is:

1. A fuel economiser for a petrol engine of the reciprocating piston type having a carburetter and a source of supply of high octane petrol and a source of supply of inferior petrol, both connected to said carburetter, said economiser comprising a single valve means interposed between said carburetter and said sources of supply and arranged to alternatively connect and disconnect said carburetter to and from the respective sources of petrol supply, spring means normally retaining said valve means in a position connecting said carburetter with said high octane supply while disconnecting said inferior supply from said carburetter, an induction manifold suction responsive means connected to said valve means and responsive to a predetermined high suction in said manifold to move said valve means against spring loading to progressively shut off the high octane supply while simultaneously progressively opening the inferior supply to said carburetter, and vice versa upon a decrease of manifold suction below said predetermined high suction, the two petrol supplies comprising a pair of float chambers and separate ducts connecting said chambers to said valve means, said valve means including a valve element having a port therethrough connecting with said carburetter, said element being movable past said ducts to cause said port to progressively move out of communication with one of said ducts while simultaneously moving into communication with the other of said ducts, said manifold suction responsive means comprising a diaphragm, and conduit means connecting one side of said diaphragm to said manifold at a position where said predetermined suction prevails under appropriate operating conditions corresponding to the loading of said spring means.

2. The fuel economiser of claim 1 including means for subjecting the diaphragm to an artificial suction under engine operating conditions of full throttle and high engine speed and consequent normally low manifold suction, to cause said valve means to move out of communication with said high octane petrol duct and into communication with said inferior petrol duct.

3. The fuel economiser of claim 2 wherein the artificial suction creating means comprises a venturi open at one end to atmosphere and connected at its other to said manifold at a position where the induced air flows into said manifold at high velocity, second conduit means extending between the throat of said venturi and the suction side of said diaphragm, and a non-return valve in said second conduit means arranged to prevent the passage of pressure from said venturi to said diaphragm but to permit the passage of pressure from said diaphragm to said venturi.

4. The fuel economiser of claim 2 wherein the artificial suction creating means comprises a venturi open at one end to atmosphere and connected at its other end to said manifold at a position where the induced air flows into said manifold at high velocity, a second suction responsive diaphragm connected in series with said first diaphragm, and a pipe connecting the suction side of said second diaphragm with the throat of said venturi.

5. The fuel economiser of claim 1 wherein said diaphragm is constructed and arranged to be movable an increased distance in response to increased suction, greater than said predetermined high suction, which prevails in said manifold under over-run conditions, said port in said valve element being arranged to be movable by said increased movement of said diaphragm out of communication with both of said petrol ducts so as to cut off all fuel supply to the engine under over-run conditions.

6. The fuel economiser of claim 2 wherein said valve means comprises a barrel and a double-land element slideable in said valve, the port in said element opening into the space between said lands, said ducts from said float chambers being connected to said barrel so that as the element moves past said ducts one duct is progressively closed off by a land while the other is correspondingly opened by the other of said lands.

References Cited in the file of this patent

UNITED STATES PATENTS

| | | |
|---|---|---|
| 2,621,029 | Moseley | Dec. 9, 1952 |
| 2,647,735 | Haynie | Aug. 4, 1953 |
| 2,652,237 | Boller | Sept. 15, 1953 |